United States Patent [19]

Revis et al.

[11] Patent Number: 4,789,478

[45] Date of Patent: Dec. 6, 1988

[54] CONVERSION OF INORGANIC IONS TO METAL SULFIDES BY MICROORGANISMS

[76] Inventors: Nathaniel W. Revis, 1060 W. Outer Dr.; Tanya R. Osborne, 108 Lynwood La.; Charles T. Hadden, 165 Waddell Cir., all of Oak Ridge, Tenn. 37830

[21] Appl. No.: 63,579

[22] Filed: Jun. 17, 1987

Related U.S. Application Data

[63] Continuation-in-part of Ser. No. 918,767, Oct. 14, 1986, abandoned.

[51] Int. Cl.$^4$ .............................. C02F 1/62; C02F 3/34
[52] U.S. Cl. .................................... 210/611; 210/631; 210/719; 210/912; 210/914; 55/72; 435/266; 435/822
[58] Field of Search ...................... 55/72, 73; 210/603, 210/606, 610, 611, 631, 718, 719–722, 912–914; 435/262, 266, 267, 282, 822

[56] References Cited

U.S. PATENT DOCUMENTS

| | | | |
|---|---|---|---|
| 4,073,690 | 2/1978 | Gibson | 435/822 X |
| 4,124,501 | 11/1978 | Yen et al. | 435/262 X |
| 4,200,523 | 4/1980 | Balmat | 210/611 |
| 4,354,937 | 10/1982 | Hallberg | 210/611 X |
| 4,519,912 | 5/1985 | Kauffman et al. | 210/611 |
| 4,519,913 | 5/1985 | Baldwin et al. | 210/611 |
| 4,522,723 | 6/1985 | Kauffman et al. | 210/611 |
| 4,584,271 | 4/1986 | Stern et al. | 435/282 X |

*Primary Examiner*—Tom Wyse
*Attorney, Agent, or Firm*—Bailey & Hardaway

[57] ABSTRACT

This invention relates to a process for reducing the concentration of heavy metal ions in an aqueous waste solution, comprising the steps of:

(a) contacting the aqueous waste solution with a mixed culture of *Citrobacter freundii* and a dissimulatory sulfate reducer, in the presence of nutrient sufficient to satisfy the nutritional requirements of the mixed culture, for a time sufficient to produce sulfide ions from a sulfide-ion precursor in the aqueous waste solution or nutrient and to precipitate the heavy metal ions in the form of corresponding sulfides and (b) removing the thus-precipitated sulfides from the waste solution.

23 Claims, No Drawings

CONVERSION OF INORGANIC IONS TO METAL SULFIDES BY MICROORGANISMS

REFERENCE TO RELATED APPLICATION

This application is a continuation-in-part of Revis et al., application Ser. No. 06/918,767, filed Oct. 14, 1986, now abandoned.

TECHNICAL FIELD

This invention relates to the use of a combination of *Citrobacter freundii* and a dissimulatory sulfate-reducing microorganism to reduce sulfide-ion precursors to sulfide ions and bring about precipitation of heavy metal ions in aqueous waste solutions as corresponding sulfides.

BACKGROUND ART

Trace elements are widely used industrially and for medical purposes. Platinum, mercury, cadmium, copper, chromium and zinc are used in the plating industries. Lead is used to make electrodes for batteries and lamps. Compounds of these metals are used as catalysts for making varnish and paint compositions.

Waste waters from mining and public utilities contain dissolved or entrained heavy metal ions. Radionuclides, particularly uranium, plutonium and cesium ions, are representative of objectionable and toxic components of waste waters from nuclear power plants or radioactive waste processing installations.

Disposal of wastes from these industries presents ecological problems, particularly when the heavy metals are in soluble forms. The soluble forms are objectionable because consumption of water, containing soluble species of heavy metals, by humans or domestic animals can result in absorption and accumulation of relatively large amounts of toxic heavy metal compounds in the organs of animals, consuming the contaminated waters. The heavy metal compounds can accumulate in nervous tissue, for example, and cause disorders of the nervous system. There is therefore considerable interest in processes for removing toxic or objectionable heavy metal species from waste waters.

Hallberg, in U.S. Pat. No. 4,354,937, has proposed precipitating heavy metals from waste waters by treating the waters with sulfate-reducing bacteria, particularly Desulfovibrio and Desulfotomaculum. Sulfides of metal contaminants in the water are precipitated and can thereafter be removed from the water.

Kauffman et al. (U.S. Pat. No. 4,519,912) have recited removing both sulfate and heavy metals from aqueous solutions by treatment with at least one anaerobic Clostridium organism and a second anaerobic organism, selected from among genera of Desulfovibrio and Desulfotomaculum. The waste water is contacted with the mixture of organisms under anaerobic conditions. Kauffman et al. (U.S. Pat. No. 4,522,723) have proposed a similar process, using Desulfovibrio or Desulfotomaculum organisms, in a porous matrix under anaerobic conditions.

Stern et al. (U.S. Pat. No. 4,584,271) have recited reducing sulfate to sulfide in a two-step bacterially-induced process, involving Desulfovibrio or Desulfotomaculum, under anaerobic conditions.

Balmat (U.S. Pat. No. 4,200,523) recites removal of sulfate from aqueous streams by treatment with sulfate-reducing bacteria, particularly *Desulfovibrio desulfuricans*, under anaerobic conditions.

Yen et al., in U.S. Pat. No. 4,124,501, have disclosed purifying oil shale retort water, using Desulfovibrio organisms to reduce sulfate to sulfide. The process contemplates aerobic oxidation of sulfide to sulfate, using aerobic organisms, such as those of the Thiobacillus family.

Baldwin et al. (U.S. Pat. No. 4,519,913) have recited removal of selenium compounds from aqueous solution by anaerobic treatment in the presence of bacteria of the genus Clostridium.

The metabolism of inorganic sulfur compounds by various microorganisms has been the subject of a review article by Peck, "Symposium on Metabolism of Inorganic Compounds, V. Comparative Metabolism of Inorganic Sulfur Compounds in Microorganisms," *Bact. Rev.*, vol. 26 (1962), pages 67–94.

Dean et al. (U.S. Pat. No. 3,674,428) and Fender et al. (U.S. Pat. No. 4,422,943) are representative of references, teaching precipitation of heavy metal ions in waste waters by addition of an inorganic sulfide compound.

It is apparent, from the amount of activity in the field, that removal of objectionable or toxic ionic species of heavy metals from waste waters is of continuing importance in providing water supplies, from recycled waste waters, which are safe for drinking or industrial uses.

It is an object of this invention to provide processes by which toxic heavy metal species can be removed from aqueous waste solutions.

DISCLOSURE OF INVENTION

This invention relates to a process for reducing the concentration of heavy metal ions in aqueous waste solutions by the steps of:

(a) contacting the aqueous waste solution with a mixed culture of *Citrobacter freundii* and a dissimulatory sulfate reducer, in the presence of an amount of nutrient sufficient to satisfy the nutritional requirements of the mixed culture, for a time sufficient to produce sulfide ions from sulfide-ion precursors in the aqueous waste solution or nutrient and to precipitate the heavy metal ions in the form of corresponding sulfides and (b) removing the thus-precipitated sulfides from the waste solution.

In another aspect, this invention relates to a process for removing heavy metal, sulfur dioxide or sulfur trioxide contaminants from gases, comprising the steps of:

(a) passing the stack gases into a mixed culture of *Citrobacter freundii* and a dissimulatory sulfate reducer, in the presence of nutrients sufficient to satisfy the nutritional requirements of the mixed culture;

(b) contacting the thus-produced mixture of culture and dissolved or entrained stack gas components for a time sufficient to convert sulfur dioxide, sulfur trioxide or other sulfide precursors in the stack gases or nutrient to sulfide;

(c) precipitating heavy metals as corresponding sulfides; and (d) removing the thus-precipitated metal sulfides from the mixture of culture and dissolved stack gas components.

In a further aspect, this invention relates to a method for immobilizing heavy metal ions in soil samples, containing sulfate-reducing microorganisms, comprising adding to the soil sample sufficient sulfide-precursor compound to cause conversion of the sulfide precursor to sulfide and to precipitate heavy metal ions as corresponding sulfides.

For the practice of this invention, a culture of a mixture of *Citrobacter freundii* and a dissimulatory sulfate reducer has been deposited with the American Type Culture Collection, Bethesda, Md., and is designated ATCC 53512.

In the event that during the pendency of this application, the Commissioner of Patents and Trademarks shall determine that some individual is entitled to receive progeny of this strain in accordance with the provisions of 37 C.F.R. 1.114 and 35 U.S.C. 122, the required written authorization will be provided by the assignee of this application.

Upon the issuance of this application as a patent, a culture of this mixture can be obtained from the permanent collection of the American Type Culture Collection.

Among dissimulatory sulfate reducers, useful in the practice of this invention, are organisms of the genus Desulfomonas. Particularly preferred are organisms of the species *Desulfomonas pigna* and related subspecies.

Although it will be understood that any of the Desulfomonas species, particulary *Desulfomonas pigna*, can be used under anaerobic conditions to reduce sulfide-precursors to sulfide, it is preferred to carry out the process under aerobic conditions, using in combination with Desulfomonas a culture of *Citrobacter freundii*, which provides the necessary conditions for reducing precursors to sulfides.

The mixed culture of Desulfomonas and *Citrobacter freundii* requires a minimum medium containing yeast extract, ascorbic acid or cysteine, sodium acetate or lactate, magnesium sulfate, dipotassium hydrogen phosphate, ammonium sulfate and sodium chloride. The pH of the medium is adjusted to 5–9, preferably to 6–8 with an acid, such as hydrochloric acid.

The minimal medium preferably contains, per liter:

| grams | |
|---|---|
| 1–15 | yeast extract |
| 0.1–1.5 | ascorbic acid or cysteine |
| 0.05–0.3 | sodium lactate or sodium acetate |
| 0.5–4 | magnesium sulfate |
| 0.05–0.3 | dipotassium hydrogen phosphate |
| 0.05–0.3 | ammonium sulfate |
| 0.1–1.5 | sodium chloride |

The foregoing medium is exemplary of nutrient "sufficient to satisfy the nutritional requirements of the mixed culture," as used in the specification and claims.

Contemplated equivalents of the minimum medium, providing support for the nutritional requirements of the mixed culture of Desulfomonas and *Citrobacter freundii*, include, but are not limited to, media containing:
 (a) sodium lactate or sodium acetate
 (b) mineral salts
 (c) sulfate
 (d) carbon source, e.g., yeast extract and
 (e) ascorbic acid or cysteine.

Sulfide precursors include, but are not limited to, sulfate, sulfite, thiosulfate, organic sulfates and similar organic or inorganic species. The sulfide precursors can be present in the aqueous waste solutions, for example, those containing dissolved stack gases from power plants. Removal of at least some of the sulfide precursors, particularly dissolved sulfur dioxide and sulfur trioxide, in inherent to the process. If the waste solutions contain insufficient sulfide precursors to precipitate all of the heavy metal ions dissolved therein, sulfide precursors are normally added in the form of sulfate ions.

The aqueous waste solution is contacted with the mixed culture of Desulfomonas and *Citrobacter freundii* at temperatures ranging from about 5° to about 35° C. However, for optimum culture growth, it is preferred to contact the waste waters with Desulfomonas and *Citrobacter freundii* cultures at higher temperatures, more preferably from 15° to about 35° C.

The process of this invention is used to precipitate significant amounts of heavy metal compounds from waste waters and is used for the reducing the concentration of metal compounds at levels as high as about 50 ppm. However, it is preferred to operate the process using feeds containing from a few ppb to about 25 ppm of ionic forms of heavy metals.

Feeds which are preferably processed in accordance with the invention include (a) aqueous waste solutions from metal plating, paint manufacturing or mining effluents; (b) waste solutions containing radionuclides from nuclear power plants or radioactive waste processing and (c) scrubbing solutions for absorption of heavy metal wastes from stack gases.

The time for contacting the aqueous waste solutions with Desulfomonas and *Citrobacter freundii* is selected so as to bring about essentially complete precipitation of heavy metal compounds as their sulfides. The time will in part be a function of the amount of sulfide-precursors in the waste waters or the nutrient medium. The time required can be as little as 5–10 minutes when the aqueous waste is contacted with confluent cells. Longer treatment times, of the order of 12 hours or more, can be required when growing mixed cultures are used. It will be understood that those skilled in the art can determine preferred and optimum contact times by routine experimentation.

The heavy metal ions, removed in accordance with the process of this invention, include, but are not limited to $Cd^{++}$, $Hg^{++}$, $Ni^{++}$, $Zn^{++}$, $Cu^{++}$, $Fe^{++}$ and $Pb^{++}$. Treatment of wastes, containing at least 1 ppm of one or more of these metals, done in a continuous mode using at least $10^=$cells/mL of Desulfomonas and at least $10^2$ cells/mL of *Citrobacter freundii*, normally requires contact times of 12–48 h. Batch treatment of such feeds, using at least $10^8$ cells/mL of Desulfomonas and at least $10^3$ cells/mL of *Citrobacter freundii*, requires contact times of 3–12 h.

Waste waters are preferably contacted with the mixed culture under aerobic conditions. The process of the present invention is therefore preferably carried out under ambient conditions, without exclusion of air from the container in which the treatment is being done. Most preferably, nitrogen is bubbled through the mixture of waste water and treatment during the process. A preferred flow rate is 0.6 mL/min.

Precipitation of sulfides of the heavy metals can occur outside the cells of the mixture, in cells, or on the surface of the cells. In any case, the insoluble sulfides can be removed from the waste waters being treated by filtration through a filter of suitable pore size.

The removal of heavy metals, in the form of sulfides, from representative contaminated water streams was demonstrated by atomic absorption spectroscopy of material collected on filters, and dissolved in nitric acid, after specified incubation times. The removal of heavy metal ions from the solutions being contacted was almost quantitative, provided the contact time was sufficiently long.

The waste solutions can be contacted with the mixed culture in an essentially aqueous medium, for example, by adding culture and nutrients to the waste solutions in the form of a broth. At the end of the contact time, the incubate can be filtered to remove insoluble materials and the filtrate, which is essentially free of heavy metal contaminants, can be recycled to a chemical process or discharged into a stream. The residue on the filter, containing metallic sulfides, can be treated in conventional ways to recover the metals.

Alternatively, the waste waters can be contacted with supported cultures of the Desulfomonas and *Citrobacter freundii* organisms. The waste waters can be passed through one or more beds of microorganisms, immobilized on, or adhered to beads of plastic, alginic acid or the like. It is preferred to use a bed of microorganisms, supported on alginic acid, because the process can be carried out continuously and the beds can be withdrawn from service periodically to recover heavy metals sulfides therefrom. When the process is being done using supported microorganisms, it will be understood materials required for satisfying the nutritional requirements of the microorganisms of the mixed culture are added to the aqueous waste feed. The pH of the feed stream will also be adjusted, as necessary.

The process of this invention can be carried out in several stages. When the aqeuous feed contains high concentrations of heavy metal compounds, it is preferred to treat the feeds in a series of treatment steps, each of which results in reducing the concentration of heavy metal ions in the feed stream.

BEST MODE FOR CARRYING OUT THE INVENTION

In a most preferred embodiment, the process of this invention is carried out at pH 6–8, at temperatures of 15°–35° C., under aerobic or anaerobic conditions in the presence of a mixed culture of *Desulfomonas pigna* and *Citrobacter freundii*, having the identifying characteristics of ATCC 53512.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the following examples, temperatures are set forth uncorrected in degrees Celsius. Unless otherwise indicated, all parts and percentages are by weight.

EXAMPLE 1

Minimal Medium for Desulfomonas and *Citrobacter freundii*

Minimal medium concentrate is prepared by dissolving ingredients, shown in Table 1, in 1000 mL of distilled water. The pH of the solution is adjusted to 7.5 using hydrochloric acid. The concentrate is sterilized by autoclaving.

Medium is prepared by diluting 100 mL of concentrate with 900 mL of distilled water.

EXAMPLE 2

Precipitation of Heavy Metal Ions as Sulfides by Action of a Mixed Culture of Desulfomonas and *Citrobacter freundii*

A test culture containing $10^8$ cells/mL of Desulfomonas and $10^5$ cells/mL of *Citrobacter freundii* (ATCC 53512) is made using minimal medium of Example 1, to which is added trace amounts of heavy metal cations. The cultures are incubated at 32° C. under aerobic conditions with shaking for the indicated time. Aliquots (3 mL) are removed and filtered on a membrane filter (0.45 micron filter), which is digested in nitric acid. Atomic absorption spectroscopic measurements of the nitric acid solution permit determination of the amount of trace element on the filter. Results are shown in Table 2 and represent the mean±SD for sets of three experiments. These results show that significant reduction of heavy metal ion concentration occurs within 6 hr and that heavy metal ions are almost completely removed within 48 h.

Controls are culture-free incubates, which are sampled at the same intervals as the test cultures. Heavy metal removal for the controls is 10–15% of the heavy metal, initially present.

TABLE 1

| Minimal Medium Concentrate for Sulfate Reducing Bacteria[a] | |
|---|---|
| | grams/1000 mL solution[b] |
| Yeast extract | 100 |
| Ascorbic acid or cysteine | 10 |
| Sodium lactate or sodium acetate | 1 |
| MgSO$_4$ | 20 |
| K$_2$HPO$_4$ | 1.0 |
| (NH$_4$)$_2$SO$_4$ | 1.0 |
| NaCl | 100 |

[a]The broth was prepared by diluting 100 mL of the concentrate with 900 mL of distilled water.
[b]The solutes were brought to a volume of 1000 mL with distilled water and pH adjusted to 7.5. The concentrate was sterilized by autoclaving before use.

TABLE 2

Metal Sulfide Formation as a Function of Incubation Time for Solutions of Heavy Metal Ions with *Citrobacter freundii* and Desulfomonas[a]

| Concentration of inorganic element added (ppm) | Incubation Time (h) | | | | |
|---|---|---|---|---|---|
| | 0 | 6 | 12 | 24 | 48 |
| | % recovery in the filtrate | | | | |
| 1 CaCl$_2$ | 95 ± 6 | 75 ± 8 | 21 ± 8 | 10 ± 3 | 12 ± 6 |
| 7 HgCl$_2$ | 90 ± 12 | 50 ± 8 | 15 ± 6 | 6 ± 1 | 5 ± 3 |
| 10 NiCl$_2$ | 88 ± 10 | 77 ± 10 | 20 ± 8 | 17 ± 8 | 10 ± 4 |
| 1 ZnCl$_2$ | 93 ± 9 | 51 ± 7 | 10 ± 2 | 7 ± 6 | 9 ± 6 |
| 5 CuCl$_2$ | 100 ± 2 | 63 ± 12 | 40 ± 6 | 30 ± 10 | 28 ± 9 |
| 10 FeCl$_2$ | 95 ± 8 | 79 ± 9 | 25 ± 3 | 18 ± 3 | 5 ± 6 |
| 10 PbCl$_2$ | 91 ± 5 | 79 ± 8 | 12 ± 8 | 8 ± 3 | 3 ± 2 |

[a]Mean ± SD for 3 experiments.

EXAMPLE 3

Comparison of Batch and Continuous Treatment of Solutions of Heavy Metal Ions

Batch experiments are carried out by contacting medium of Example 1, containing 5 ppm of an indicated heavy metal chloride, with $10^{12}$ cells/mL of Desulfomonas and $10^5$ cells/mL of *Citrobacter freundii*. The cultures are incubated at 32° C. for 5 h, after which 10-mL aliquots of the cultures are filtered through a membrane filter as in Example 2. Heavy metal ion concentration is measured by atomic absorption spectroscopy.

Continuous contacting of minimal medium, containing 5 ppm of an indicated metal chloride, is carried out using culture containing $10^9$ cells/mL of Desulfomonas and $10^5$ cells/mL of *Citrobacter freundii*. Incubation is continued for 24 h at 32° C. Aliquots are removed and analyzed as above. Results are shown in Table 3. These results shows that almost complete removal of objectionable metal ions can be accomplished by either batch or continuous processes.

EXAMPLE 4

Effect of Sulfate Addition on Activity of Soil Samples

Soil samples are treated with a culture of Desulfomonas ($10^8$ cells/mL) and *Citrobacter freundii* ($10^4$ cells/mL) at 30° C., with and without added sulfate. Sulfate, if added, is a 1:1 mixture by weight of ferric ammonium sulfate and magnesium sulfate. Sulfate-reducing activity is indicated by formation of black precipitate in the soil sample within 24 h after mixing the cultures with soil samples.

Results are shown in Table 4. These samples show that addition of 100 ppm of sulfate greatly improves sulfate-reducing activity of the mixed culture and that sulfate levels of 200 ppm permit reduction in all cases.

EXAMPLE 5

Effect of Adding Calcium Sulfate to Soil Columns on Leaching of Mercury

A solution of minimal medium, containing 1000 ppb of mercury (as mercuric chloride), is treated with Desulfomonas and *Citrobacter freundii* ($10^8$ and $10^5$ cells/mL, respectively) at 30° C. Calcium sulfate (500 ppm with respect to soil) is added at the top of the column or mixed with the soil. The amount of mercury leached out of the soil column by passage of deionized water through the column at a rate of 1 mL/h is determined by atomic absorption spectroscopy (cold vapor technique).

As shown by the results in Table 5, addition of a sulfate to a soil sample markedly reduces the rate at which mercury is leached from the sample.

TABLE 4

Sulfate-reducing Activity in Amended Soil Samples as a Function of Sulfate Concentration[a]

| Sample No. | Sulfate added to soil (ppm) | | |
|---|---|---|---|
| | 0 | 100 | 200 |
| 1 | − | + | + |
| 2 | − | + | + |
| 3 | − | + | + |
| 4 | − | + | + |
| 5 | − | + | + |
| 6 | − | − | + |
| 7 | − | + | + |
| 8 | − | + | + |
| 9 | − | − | + |
| 10 | − | + | + |
| 11 | − | − | + |

[a]Sulfate-reducing activity is indicated by + and inactivity by −

TABLE 5

Effect of Adding CaSO4 on Leaching of Mercury from Soil Columns

| | Time (days) | | |
|---|---|---|---|
| | 7 | 42 | 84 |
| | Hg Leaching (ppb) | | |
| Controls | 3.9 | 2.34 | 0.69 |
| CaSO4 (500 ppm) added to top of column | 0.88 | 0.20 | 0.23 |
| CaSO4 (500 ppm) mixed with soil | 1.3 | 0.35 | 0.23 |

EXAMPLE 6

Determination of Optimum Conditions for Reduction of Sulfide-ion Precursors to Sulfide Ions Minimal medium, as in Example 1, containing yeast extract, ascorbic acid or cysteine, sodium lactate or acetate, magnesium and ammonium sulfates, dipotassium hydrogen phosphate and sodium chloride, is preferred.

For a continuous process, preferred concentrations of Desulfomonas are $10^6$–$10^{10}$ cells/mL and of *Citrobacter freundii*, $10^3$–$10^7$ cells/mL.

For batch processes, cellular concentrations of $10^9$–$10^{13}$ cells/mL of Desulfomonas and $10^4$–$10^8$ cells/mL of *Citrobacter freundii*, are preferred.

Although conversion of sulfate to sulfide is a reductive process, the process can be carried out under aerobic conditions using *Citrobacter freundii* in combination with Desulfomonas.

The preceding examples can be repeated with similar success by substituting the generically or specifically described reactants and/or operating conditions of this invention for those used in the preceding examples.

From the foregoing description, one skilled in the art can easily ascertain the essential characteristics of this

TABLE 3

Comparison of Batch and Continuous Processes for Sulfidation of Heavy Metal Ions

| Process | Conditions | % Recovery of Metal Added[c] | | | | | |
|---|---|---|---|---|---|---|---|
| | | Fe | Cd | Zn | Ca | Hg | Pb |
| Batch | Control | 10 ± 6 | 9 ± 3 | 14 ± 8 | 18 ± 7 | 6 ± 6 | 5 ± 2 |
| | Experimental[a] | 93 ± 6 | 88 ± 8 | 90 ± 10 | 89 ± 3 | 94 ± 8 | 90 ± 12 |
| Continuous | Control | 12 ± 8 | 14 ± 4 | 10 ± 2 | 20 ± 3 | 11 ± 6 | 8 ± 2 |
| | Experimental[b] | 84 ± 15 | 93 ± 8 | 80 ± 12 | 77 ± 5 | 91 ± 18 | 99 ± 7 |

[a]Cells added at concentrations of $10^{12}$ cells/mL for Desulfomonas and $10^5$ cells/mL for *Citrobacter freundii*; incubation period 5 h.
[b]Cells added at concentrations of $10^9$ cells/mL for Desulfomanas and $10^5$ cells/mL for *Citrobacter freundii*; incubation period 24 h.
[c]Results are mean ± SD for 3 experiments.

We claim:

1. A process for reducing the concentration of heavy metal ions in an aqueous waste solution, comprising the steps of:
   (a) contacting the aqueous waste solution with a mixed culture of *Citrobacter freundii* and a dissimulatory sulfate reducer in the presence of nutrient sufficient to satisfy the nutritional requirements of the mixed culture for a time sufficient to produce sulfide ions from sulfide-ion precursors in the aqueous waste solution or the nutrient and to precipitate the heavy metal ions in the form of corresponding sulfides and
   (b) removing the thus-precipitated sulfides from the waste solution.

2. The process of claim 1, wherein the dissimulatory sulfate reducer is of the genus Desulfomonas.

3. The process of claim 2, wherein the aqueous waste solution is contacted with a mixed culture of *Desulfomonas pigna* and *Citrobacter freundii*.

4. The process of claim 2, done in batch fashion in the presence of at least $10^8$ cells/mL of Desulfomonas and at least $10^3$ cells/mL of *Citrobacter freundii*.

5. The process of claim 1, wherein the mixed culture is *Citrobacter freundii* and a dissimulatory sulfate reducer, having the identifying characteristics of ATCC 53512.

6. The process of claim 5, wherein the aqueous waste solution is contacted with the mixture of *Citrobacter freundii* and dissimulatory sulfate reducer, ATCC 53512, under aerobic conditions.

7. The process of claim 5, done continuously in the presence of a mixture of at least $10^5$ cells/mL of dissimulatory sulfate reducer and at least $10^2$ cells/mL of *Citrobacter freundii*, ATCC 53512.

8. The process of claim 1, wherein the aqueous waste solution is contacted with the mixture of *Citrobacter freundii* and dissimulatory sulfate reducer under aerobic conditions.

9. The process of claim 1, wherein precipitation of heavy metal ions in the form of corresponding sulfides occurs outside the cells of the mixed culture.

10. The process of claim 1, wherein precipitation of heavy metal ions in the form of corresponding sulfides occurs in the cells or on the surface of cells of the mixed culture.

11. The process of claim 1, wherein the aqueous waste solution is from metal plating, paint manufacturing or mining effluents.

12. The process of claim 1, wherein the aqueous waste solution contains radionuclides from nuclear power plants or radioactive waste processing.

13. The process of claim 1, wherein the aqueous waste solution is a scrubbing solution for absorption of heavy metal wastes from stack gases.

14. The process of claim 1, done continuously in the presence of at least $10^5$ cells/mL of dissimulatory sulfate reducer and at least $10^2$ cells/mL of *Citrobacter freundii*.

15. The process of claim 14 wherein the aqueous waste solution contains at least 1 ppm of one or more of $Cd^{++}$, $Hg^{++}$, $Ni^{++}$, $Zn^{++}$, $Cu^{++}$, $Fe^{++}$ or $Pb^{++}$ and the aqueous waste solution is contacted with the mixed culture for 12–48 h.

16. The process of claim 1, done in batch fashion in the presence of at least $10^8$ cells/mL of dissimulatory sulfate reducer and at least $10^3$ cells/mL of *Citrobacter freundii*.

17. The process of claim 16, wherein the aqueous waste solution contains at least 1 ppm of one or more of $Cd^{++}$, $Hg^{++}$, $Ni^{++}$, $Zn^{++}$, $Cu^{++}$, $Fe^{++}$ or $Pb^{++}$ and the aqueous waste solution is contacted with the mixed culture for 3–12 h.

18. The process of claim 1, carried out at pH 6–8 and a temperature of 15°–35° C.

19. The process of claim 1, carried out at pH 6–8, at temperatures of 15°–35° C., under aerobic conditions.

20. The process of claim 1, carried out at pH 6–8, at temperatures of 15°–35° C., under aerobic conditions in the presence of a mixed culture of dissimulatory sulfate reducer and *Citrobacter freundii*, having the identifying characteristics of ATCC 53512.

21. A process for removing heavy metal, sulfur dioxide or sulfur trioxide contaminants from stack gases comprising the steps of
   (a) passing the stack gases into a mixed culture of *Citrobacter freundii* and a dissimulatory sulfate reducer, in the presence of nutrients sufficient to satisfy the nutritional requirements of the mixed culture;
   (b) contacting the thus-produced mixture of culture and dissolved or entrained stack gas components for a time sufficient to convert sulfur dioxide, sulfur trioxide or other sulfide precursors in the stack gases or the nutrient to sulfide;
   (c) precipitating heavy metals as corresponding sulfides; and
   (d) removing the thus-precipitated metal sulfides from the mixture of culture and dissolved or entrained stack gas components.

22. The process of claim 21, wherein the mixed culture comprises Desulfomonas and *Citrobacter freundii*.

23. The process of claim 21, whein the mixed culture is a dissimulatory sulfate reducer and *Citrobacter freundii*, having the identifying characteristics of ATCC 53512.

* * * * *